F. K. RUSSELL.
NUT CRACKING MECHANISM.
APPLICATION FILED DEC. 13, 1915.
1,235,246.
Patented July 31, 1917.
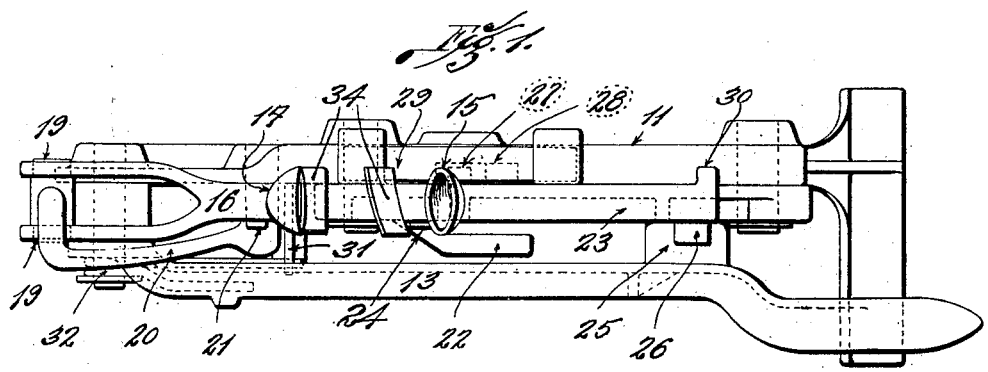
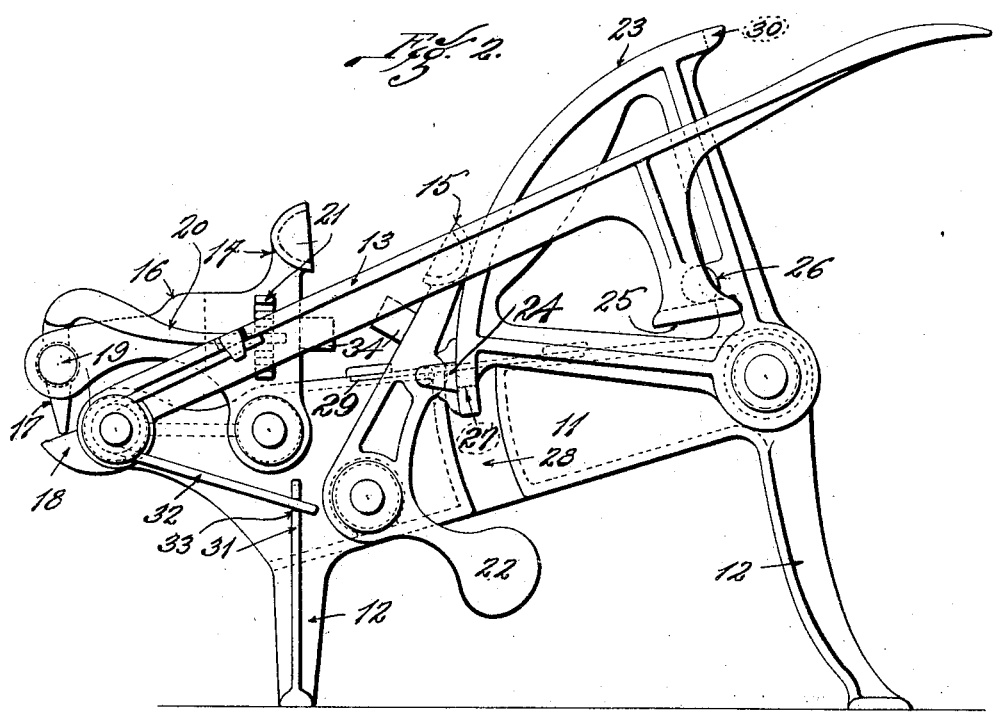
WITNESSES:
E. M. Harrington.
A. M. Holcombe.
INVENTOR:
Frank K. Russell,
by Carr & Carr,
HIS ATTY'S.

UNITED STATES PATENT OFFICE.

FRANK K. RUSSELL, OF DALLAS, TEXAS, ASSIGNOR TO F. K. RUSSELL MACHINE COMPANY, OF DALLAS, TEXAS, A CORPORATION OF TEXAS.

NUT-CRACKING MECHANISM.

1,235,246.  Specification of Letters Patent.  Patented July 31, 1917.

Application filed December 13, 1915. Serial No. 66,458.

*To all whom it may concern:*

Be it known that I, FRANK K. RUSSELL, a citizen of the United States, and a resident of the city of Dallas, in the county of Dallas and State of Texas, have invented a new and useful Improvement in Nut-Cracking Mechanism, of which the following is a specification.

This invention relates to nutcracking mechanism wherein the cracking jaws are adjusted to the size of the nut automatically by means other than that which effects the cracking stroke.

Prior nutcracking machines or devices have been provided with self-adjusting jaws, or take-up and lock mechanism for the jaws, dependent for the uniform cracking of various sizes of nuts on a uniform length of cracking stroke after the take-up action or adjustment of the jaws to the nut had taken place.

However, in actual practice many nuts are so much above or below an average size that not only is pre-adjustment of the jaws to the nut necessary, but the actual cracking stroke should be controlled so as to be shorter for nuts below the average and longer for nuts above the average in size. Otherwise the meat would be broken in very short nuts and the shells of large nuts would often spring enough to prevent cracking them sufficiently.

This invention has the following objects: First, automatic pre-adjustment of the jaws to the nut; second, a variable cracking stroke after the said adjustment; third, manual adjustment of the length of the cracking stroke to suit nuts of different strength and elasticity. It is also my desire to attain the foregoing objects in a light, portable device which will crack nuts rapidly and easily without crushing the nut and without tiring the arm of the operator; one which does not require fastening to a table before operating, which requires only one simple downward movement of the hand to operate it and returns to normal position automatically, and which is strong, simple in construction, and cheap to manufacture.

Generally stated, the form of the invention shown herein consists of a frame or standard, two movable jaws mounted thereon, a gravity operated adjusting lock for initially adjusting the jaws to grip the nut, and an actuating lever for controlling the gravity lock and for causing cracking movement of one jaw, means for adjusting the ratio of the levers which actuate the cracking jaw, a stop for limiting the throw of the actuating lever, and a spring for returning the actuating lever and other movable parts to initial position.

Further objects and details of the invention appear in connection with the following description of the device illustrated in the accompanying drawings; and what the invention consists in is more particularly defined in the appended claims.

In the drawings, wherein the same reference characters designate the same parts in the several views, Figure 1 is a top view of a device embodying the invention; and Fig. 2 is a side view of the same.

Referring more particularly to the drawings, the invention is illustrated as embodied in a portable nutcracker having a horizontal frame 11, which is supported on legs 12 adapted to rest on the top of a table or other horizontal surface. At the head end of the frame an operating lever 13 is pivotally mounted to swing in a vertical plane, the free end of the lever extending toward the other end of the frame and having a handle at its extremity. The legs and handle are so arranged that pressing the latter down will not upset the device. The nuts are cracked between two movable jaws 14, 15 which are pivoted to the frame alongside of the operating lever. These jaws are arranged to oscillate in a vertical plane parallel to the plane of movement of the operating lever, and their upper ends project above the frame and are cupped to hold a nut between them. The jaw 14 nearest to the pivoted end of the operating lever is provided with a lever arm 16, which is bifurcated at its free end, and supports between the two branches the adjustable foot 17, which in turn is adapted to be engaged by a short projection 18 upon the pivoted end of the operating lever. The foot 17 is pivoted on trunnions 19 journaled in the branches of the arms 16, and is held in adjusted position by means of a detent arm which is integral with the foot and trunnions, and the free end of which has a detent 20 adapted to engage in one of a series of notches 21 in the side of the frame. The detent arm is shaped to be flexible sidewise and stiff vertically. The projection 18 supports the weight of the free end of the jaw to maintain it in operative position, and to swing it toward the other jaw 15 when the handle is depressed. The jaw 15 is provided with a weight or counter-balance 22 which tends to swing it away from the jaw 14 to hold the jaws open to receive a nut.

Although in this device the cracking stroke is variable in length, and is automatically adjusted to suit extreme sizes of nuts, still there is sometimes a difference in the elasticity of nuts in different lots due to difference in quality, age, moisture, or other cause. Therefore, it is desirable at times to change the ratio of cracking stroke to the length of the nut, and this may be done by adjusting the movable foot 17 to engage the lever arm 16 nearer to or farther from its pivot point.

An approximately quadrant or sector shape cam 23 is pivoted to the tail end of the frame alongside of the handle end of the operating lever. The cam 23 is arranged to swing up and down in a vertical plane behind the jaw 15, and the curved edge of the cam 23 bears against a shoe 24 pivoted on the back of the jaw 15 to adjust the jaw to the nut and to support it in working position. The shape of the edge of the cam 23 approximates a sector of a spiral curve of constantly increasing radius from the center, and the bearing face of the shoe coöperating therewith is slightly concave to conform thereto. In its initial or normal position, the major portion of the cam sector stands above the horizontal line through its center pivot, and the shoe 24 bears against its edge near the lower end of the cam, which is the end of minimum radius.

The handle end of the operating lever has a projecting ledge 25 on its back side upon which a lug 26 on the front side of the cam 23 rests, and thereby the cam is normally supported with the sector in its upper position, in which position the jaws are wide open. When the operating handle is depressed, the weight of the sector portion 23 will cause it to drop with the handle, whereby the portion of the sector of increasing radius engages the bearing shoe 24 and moves the jaw 15 toward the coöperating jaw 14. Also, the jaw 14 is simultaneously advanced toward the jaw 15 by the upward movement of the projection 16 on the pivoted end of the operating lever.

The bearing shoe 24 for engaging the cam is pivoted to the jaw 15 at a point about half-way between the pivot and the cup end of the jaw. This causes the cup to move faster than the point of contact of the shoe against the cam; and hence the total throw of the cam can be much less than the movement of the jaw, and the cam sector can be made with a very gradual change in its radius, such that the angle of friction between it and the shoe is not exceeded and there is no liability of retrograde movement of the cam. Heretofore, very long wedges have been required to adjust the jaw, which construction would not be well adapted for a light, portable machine.

The lower edge of the cam 23 has a projecting lug 27 on its back face which moves in an arc shape slot 28 in the frame. A flat spring 29 is mounted on the frame across the upper end of the arc shape slot 28 to stop further upward movement of the cam beyond its normal position. A lug 30 on the upper back edge of the cam engages the spring 29 at the extremity of the downward movement of the sector to arrest it. The spring 29 cushions the cam at the ends of its oscillating movements and reduces the noise of operation of the device.

A lug 31 on the frame projects below the operating lever and arrests it at the end of the down stroke. A spring 32 of looped wire is secured at one end in a notch 33 in the side of the frame, and the other end engages the operating lever near its pivoted end, the middle portion being coiled around the pivot of the operating lever. This looped spring 32 returns the operating lever and cam sector to their normal raised positions when the pressure on the handle is released, and thus automatically causes both jaws to assume a position for receiving a nut. The jaws 14, 15 are provided with inclined shelves 34 for deflecting nut shells away from the operating parts of the device.

The operation of the device is as follows: A nut is placed between the jaws with the thumb and finger of one hand, and the operating lever is depressed with the other hand, thereby causing the jaws to approach each other simultaneously. The motion of the jaw 15, which is relatively very rapid, will be arrested when it strikes the nut, and the cam sector will lock it in place in its arrested position. Continued downward movement of the handle will not affect the position of the cam sector and jaw 15, but will force the jaw 14 toward the jaw 15 to crack the nut until further movement is stopped by the operating lever striking the stop lug 31.

It will be noticed that the direction of travel of the handle is such that the pressure of the hand to operate it is downward and approximately over the base of the device, thereby making it unnecessary to clamp or otherwise fasten the device in order to operate it satisfactorily.

It is apparent from the foregoing description that not only is the device adapted for cracking nuts ranging from small to large in size without any change in the leverage or manual adjustment of the jaws, that the length of the working or actual cracking stroke is automatically controlled to suit the size of the nut, in order to crack large nuts with a single stroke and to prevent crushing small nuts.

It is evident that modifications in the shape and arrangement of the parts may be made, and the invention is not restricted to the shapes and arrangements shown and described. It is also evident that, as this invention makes it possible to use a uniform length of stroke where the actuating force is applied to the actuating lever, this mechanism may be actuated by other than hand power without departing from the herein disclosed invention.

I claim the following as my invention:

1. A nutcracker comprising a frame, two oppositely disposed movable jaws mounted in said frame, a separately controlled self-acting lock for moving one of said jaws toward the other and locking it in adjusted position, and means for engaging the other jaw to move it toward the first jaw after it is locked a distance inversely proportional to the movement of said locked jaw prior to being locked.

2. A nutcracker comprising a frame, two oppositely disposed movable jaws mounted on said frame, a mechanically controlled gravity lock for moving one of said jaws toward the other and locking it in adjusted position, and a hand lever pivoted to said frame and engaging the other jaw after said jaw is locked a distance proportional to the size of the nut to move it toward the first jaw.

3. A nutcracker comprising a frame, two oppositely disposed movable jaws mounted on said frame, a gravity operated lock for moving one of said jaws toward the other, and a hand lever pivoted to said frame and engaging the other jaw to move it toward the first jaw, said hand lever having a portion which engages said gravity lock to release it on the return stroke.

4. A nutcracker comprising a frame, two oppositely disposed jaws pivotally mounted in said frame, a locking cam pivoted behind one of said jaws for moving it toward the other and holding it in working position, and a handle lever pivoted to said frame and engaging the other jaw to move it toward the first jaw, said hand lever having a portion which engages said locking cam to control the locking position to suit the length of working stroke to the shape and size of the nut.

5. A nutcracker comprising a frame, two oppositely disposed jaws movably supported in said frame and adapted to grip a nut, an adjustable abutment for one of said jaws, and a hand lever having means for engaging the other jaw to move it toward the first jaw, said hand lever having connection with said abutment for controlling its adjusted position to suit the shape and size of the nut.

6. A nutcracker comprising a frame, two oppositely disposed movable jaws mounted on said frame, an adjustable lock for holding one of said jaws, a lever provided with means for engaging the other jaw to move it toward the first jaw, and a stop for limiting the stroke of said lever, said lever having means for controlling the movement of said adjustable lock.

7. A nutcracker comprising a frame, two oppositely disposed movable jaws mounted on said frame, an adjustable lock for holding one of said jaws, means for controlling the movement of said adjustable lock, a lever provided with means for engaging the other jaw to move it toward the first jaw, and a stop for limiting the stroke of said lever.

8. In a nutcracking mechanism, in combination with a pair of relatively movable jaws and means for moving one of said jaws toward the other to grip a nut, an adjustable abutment for one of said jaws, the adjustment of said abutment being controlled by the size of the nut, and means for varying the ratio between the movement of said jaws toward each other and the movement of the handle.

9. In a nutcracking mechanism, in combination with a pair of relatively movable jaws and means for moving said jaws toward each other to grip a nut, said means permitting stopping the movement of one of said jaws toward the other upon contacting with the nut while causing further movement of the other jaw to crack the nut in proportion to the size of the nut.

10. In a nutcracking mechanism, in combination with a pair of relatively movable jaws and means for moving said jaws toward each other, said jaws being adapted to hold a nut between them, means for locking one of said jaws against backward movement after the completion of part of its stroke, and means operating during the movement of the jaws to vary the length of the cracking stroke with respect to the operating means to avoid crushing the nut.

11. In a nutcracking mechanism, in combination with a pair of relatively movable jaws, means to cause said jaws to approach each other rapidly to grip a nut, and means to cause a slower relative movement of said jaws toward each other to crack the nut, said further movement being of varying amount depending upon the size of the nut, whereby crushing small nuts or incomplete cracking of large nuts is obviated.

12. In a nutcracking mechanism, in combination with a pair of relatively movable jaws, means for causing said jaws to approach each other to grip a nut, means to lock one of said jaws upon completing the initial gripping movement thereof, and means to cause a further movement of the other of said jaws to crack the nut, said further movement being of varying amount depending upon the size of the nut, whereby the elasticity of large nuts is overcome and crushing small nuts is obviated.

13. A nutcracking mechanism having jaws, wedging means for moving one jaw to grip the nut and holding said jaw against retrogression, a handle for operating said mechanism, and a spring for returning the handle to its starting position.

14. A nutcracking mechanism having a jaw pivoted at one end and carrying a cup at the other end, adjusting and locking mechanisms, means engaging said adjusting and locking mechanism with said pivoted jaw between its pivot and cup, and a spring for holding said mechanism in position to receive a nut.

15. A nutcracking mechanism having a jaw, a pivoted cam having its working face parallel with the axis thereof and coöperating with said jaw to move it toward the nut and prevent retrograde action of the jaw while pressure is applied to the nut.

16. A nutcracking mechanism comprising cupped jaws, a cam and a lever for actuating same, one of said cupped jaws being carried on the end of a pivoted member, said member being adapted to make contact at a point between its jaw and pivot with said cam whereby said jaw is made to move in an amount more than the movement of said point of contact.

17. A nutcracker comprising cupped jaws, a cam and means for actuating said jaws, one of said cupped jaws being pivoted and adapted for contact with said cam at a point between the jaw cup and pivot, whereby said jaw cup is moved a greater distance than the throw of said cam.

18. A nutcracking mechanism having a jaw and an oscillatory cam adapted to be actuated by its own weight to coöperate with said jaw to adjust it to different sized nuts and prevent retrogression of said jaw.

19. A nutcracking device having a jaw, a cam, actuating means associated with said jaw for making contact with said cam whereby said jaw may be moved toward a nut faster than the movement of said actuating means at its point of contact with said cam.

20. A nutcracking device having a jaw, a rotary gravity actuated cam, a contact member actuated and held against retrogression by said cam, and multiplying means whereby said jaw moves faster than said contact member.

21. A nutcracking mechanism comprising a jaw, means for moving said jaw toward the nut, means actuated by gravity for causing said jaw to move away from the nut, and locking means to hold said jaw stationary while a nut is being cracked.

22. A nutcracking device having a pivoted jaw, means for moving said jaw toward the nut, means for locking said jaw stationary while the nut is being cracked and a weight for moving said jaw away from the nut when said jaw is released.

23. A nutcracking device comprising a jaw, a wedging device for moving said jaw toward the nut and locking it against backward movement while the nut is being cracked, said jaw being pivoted at one end and carrying a cup for gripping the nut at the other end, and means positioned between the two ends for coöperating with the wedging device.

24. A nutcracking device having a member rotatably mounted and provided with a cup so placed as to travel in an arc, and a locking device for preventing retrogression of said cup while cracking a nut.

25. A nutcracking mechanism comprising a frame, two movable jaws mounted thereon, a gravity operated adjusting lock for initially adjusting the jaws to grip the nut, an operating arm for one jaw, and an actuating lever for controlling the gravity lock and coöperating with said arm for causing cracking movement, means for adjusting the ratio of the levers which actuate the cracking jaw, a stop for limiting the throw of the actuating lever, and a spring for returning the actuating lever and other movable parts to initial position.

26. A nutcracking device comprising a jaw, a wedging device for moving said jaw toward the nut and locking it against backward movement while the nut is being cracked, said jaw being pivoted at one end and carrying a cup for gripping the nut at the other end, and a bearing member pivoted to said jaw between its two ends for coöperating with the wedging device.

27. A nutcracker comprising cupped jaws, a cam and means for actuating said jaws, one of said cupped jaws being pivoted and having a rocking member secured thereto for contact with said cam at a point between the jaw cup and pivot, whereby said jaw cup is moved a greater distance than the throw of said cam.

28. A nutcracker comprising vertically arranged jaws adapted to grip a nut between their upper ends, means for operating said jaws to crack a nut, and deflectors secured to said jaws below their supper ends to prevent nut shells from dropping into said actuating mechanism.

29. A nutcracker comprising vertically arranged jaws having inclined shelves below their gripping ends for deflecting nut shells away from between the lower ends of said jaws.

Signed at Dallas, Texas, this 7 day of December, 1915.

FRANK K. RUSSELL.

Copies of this patent may be obtained for five cents each, by addressing the "Commissioner of Patents, Washington, D. C."